US011346922B2

United States Patent
Masui et al.

(10) Patent No.: US 11,346,922 B2
(45) Date of Patent: May 31, 2022

(54) OBJECT RECOGNITION APPARATUS AND OBJECT RECOGNITION METHOD

(71) Applicants: DENSO CORPORATION, Kariya (JP); TOYOTA JIDOSHA KABUSHIKI KAISHA, Toyota (JP)

(72) Inventors: Yohei Masui, Kariya (JP); Tadashi Sakai, Kariya (JP); Takashi Maeda, Nagoya (JP); Takeshi Nanami, Toyota (JP); Minoru Nakadori, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 16/089,141

(22) PCT Filed: Mar. 29, 2017

(86) PCT No.: PCT/JP2017/013118
§ 371 (c)(1),
(2) Date: Sep. 27, 2018

(87) PCT Pub. No.: WO2017/170799
PCT Pub. Date: Oct. 5, 2017

(65) Prior Publication Data
US 2020/0300969 A1    Sep. 24, 2020

(30) Foreign Application Priority Data
Mar. 31, 2016    (JP) .............................. JP2016-072804

(51) Int. Cl.
*G01S 7/41*    (2006.01)
*B60R 11/04*    (2006.01)
(Continued)

(52) U.S. Cl.
CPC ............... *G01S 7/411* (2013.01); *B60R 11/04* (2013.01); *G01S 13/42* (2013.01); *G01S 13/867* (2013.01);
(Continued)

(58) Field of Classification Search
CPC ........ G01S 7/411; G01S 13/42; G01S 13/867; G01S 13/931; B60R 11/04; B60W 30/095; B60W 30/14
(Continued)

(56) References Cited

U.S. PATENT DOCUMENTS

| | | | | |
|---|---|---|---|---|
| 5,005,147 A | * | 4/1991 | Krishen | G06K 9/6293 703/13 |
| 5,652,588 A | * | 7/1997 | Miron | G01S 13/86 342/54 |

(Continued)

FOREIGN PATENT DOCUMENTS

| | | |
|---|---|---|
| DE | 60315208 T2 | 4/2008 |
| EP | 1462823 A1 * | 9/2004 ........... G01S 13/931 |

(Continued)

*Primary Examiner* — Olumide Ajibade Akonai
*Assistant Examiner* — Alexander L. Syrkin
(74) *Attorney, Agent, or Firm* — Maschoff Brennan (57) ABSTRACT

An object recognition device recognizes an object around the own vehicle by using a radar device and an imaging device. The object recognition apparatus includes: information combining unit that generates combined target information by combining radar-based target information with image-based target information if the object is being detected by the radar device and the imaging device, the radar-based target information being information on an object detected by the radar device, the image-based target information being information on an object detected by the imaging device; and an identical object determining unit that determines that an object detected by the imaging device is (Continued)

identical with an object detected by the radar device, based on time-dependent change of the combined target information.

9 Claims, 5 Drawing Sheets

(51) Int. Cl.
  *G01S 13/42*   (2006.01)
  *G01S 13/86*   (2006.01)
  *G01S 13/931*   (2020.01)
  *B60W 30/095*   (2012.01)
  *B60W 30/14*   (2006.01)

(52) U.S. Cl.
  CPC .......... *G01S 13/931* (2013.01); *B60W 30/095* (2013.01); *B60W 30/14* (2013.01)

(58) Field of Classification Search
  USPC .......................................................... 342/55
  See application file for complete search history.

(56) References Cited

U.S. PATENT DOCUMENTS

| | | | | |
|---|---|---|---|---|
| 5,943,476 | A * | 8/1999 | Dougherty | B25J 9/1694 |
| | | | | 700/259 |
| 8,818,703 | B2 * | 8/2014 | Harada | B60R 21/0134 |
| | | | | 701/301 |
| 8,917,321 | B1 * | 12/2014 | Sasabuchi | H04N 5/2256 |
| | | | | 348/119 |
| 10,037,472 | B1 * | 7/2018 | Chen | G01S 13/867 |
| 10,366,295 | B2 * | 7/2019 | Matsumoto | B60R 11/04 |
| 2003/0160866 | A1 | 8/2003 | Hori et al. | |
| 2007/0168128 | A1 * | 7/2007 | Tokoro | B60R 21/013 |
| | | | | 701/301 |
| 2011/0301845 | A1 * | 12/2011 | Harada | B60R 21/0134 |
| | | | | 701/301 |
| 2013/0245929 | A1 * | 9/2013 | Withopf | G01S 13/588 |
| | | | | 701/300 |
| 2014/0368668 | A1 * | 12/2014 | Sasabuchi | G01S 13/867 |
| | | | | 348/187 |
| 2015/0338516 | A1 * | 11/2015 | Kijima | G06K 9/00825 |
| | | | | 701/1 |
| 2016/0107643 | A1 * | 4/2016 | Mizutani | G01S 13/931 |
| | | | | 701/519 |
| 2016/0116573 | A1 * | 4/2016 | Appia | G01S 7/4026 |
| | | | | 342/52 |
| 2017/0242117 | A1 * | 8/2017 | Izzat | G01S 17/86 |
| 2017/0307730 | A1 * | 10/2017 | Baba | G01S 7/40 |
| 2018/0156914 | A1 * | 6/2018 | Tuxen | G01S 13/58 |

FOREIGN PATENT DOCUMENTS

| | | | | |
|---|---|---|---|---|
| JP | 2003-252147 A | | 9/2003 | |
| JP | 2007-232411 A | | 9/2007 | |
| JP | 2007279892 A | * | 10/2007 | ............... G08G 1/16 |
| JP | 2009-019914 A | | 1/2009 | |
| JP | 2010-038888 A | | 2/2010 | |

* cited by examiner

OBJECT RECOGNITION APPARATUS AND OBJECT RECOGNITION METHOD

CROSS REFERENCE TO RELATED APPLICATIONS

The present application is a national stage application under 35 U.S.C. § 371(c) of PCT Application No. PCT/JP2017/013118, filed on Mar. 29, 2017, which is based on Japanese Patent Application No. 2016-072804, filed Mar. 31, 2016, the entire contents of which are incorporated herein by reference.

TECHNICAL FIELD

The present disclosure relates to an object recognition apparatus and an object recognition method, and more particularly, to an object recognition apparatus and an object recognition method applied to a vehicle to which a radar device and an imaging device are mounted as object detection sensors.

BACKGROUND ART

Various techniques are proposed for improving recognition accuracy of objects around the vehicle by determining whether the object detected by a radar device, such as a millimeter wave radar or a laser radar, is identical with the object detected by an imaging device, such as an image camera (e.g., see PTL 1). PTL 1 discloses that displacement of an object per predetermined time is calculated by radar ranging and image processing, and if the displacements calculated from the two processes are not consistent, the detected object is not determined to be an obstacle.

CITATION LIST

Patented Literatures

[PTL 1]: JP2003-252147 A

SUMMARY OF THE INVENTION

Distance measurement accuracy is different between radar devices and imaging devices. Radar devices exert high accuracy in distance measurement, while imaging devices exert poor performance in distance measurement based on image recognition. For a distant area in particular, accuracy of image recognition tends to deteriorate due to decrease in the number of pixels. For this reason, when an object detected by a radar device is recognized separately from an object detected by an imaging device, followed by comparing the behaviors of the recognized objects with each other to make an identical object determination as in PTL 1, there is a concern that the determination will be difficult due to deterioration in the accuracy of image recognition if the object is distantly located.

The present disclosure has been made in light of the issues set forth above and has an object of providing an object recognition apparatus and an object recognition method that can accurately implement identical object determination for an object detected by a radar device and an object detected by an imaging device, while minimizing the influence of deterioration in the accuracy of image recognition.

To solve the above issues, the present disclosure adopts the following configuration.

In a first aspect of the present disclosure, there is provided an object recognition apparatus that recognizes an object around an own vehicle, using a radar device and an imaging device. The apparatus includes an information combining unit and an identical object determining unit. The information combining unit generates combined target information as information on the object by combining radar-based target information with image-based target information if the object is being detected by the radar device and the imaging device, the radar-based target information being information on an object detected by the radar device, the image-based target information being information on an object detected by the imaging device. The identical object determining unit determines that an object detected by the radar device is identical with an object detected by the imaging device, based on time-dependent change of the combined target information.

With the above configuration, identical object determination is implemented as to whether an object detected by the radar device is identical with an object detected by the imaging device, based on time-dependent change of the combined target information that is obtained by combining the information on an object detected by the radar device with the information on an object detected by the imaging device. There is a difference in the time-dependent change of combined target information due to variation in position relationship of the target, between the case where the combined target information is generated based on a correct combination and the case where the combined target information is generated based on an erroneous combination. In this regard, the above configuration enables distinction as to whether an object detected by the radar device is identical with an object detected by the imaging device. Furthermore, using the information obtained by both the radar device and the imaging device, the influence of deterioration in the accuracy of image recognition can be compensated by the detection performance of the radar device. Thus, while minimizing the influence of deterioration in the accuracy of image recognition, the above configuration can implement identical object determination with high accuracy.

BRIEF DESCRIPTION OF THE DRAWINGS

Referring to the accompanying drawings, specific description will be provided below to clarify the above object and other objects, characteristics and advantageous effects of the present disclosure. In the drawings.

DESCRIPTION OF EMBODIMENTS

With reference to the drawings, some embodiments will be described. In the following embodiments, components that are the same or equivalent to each other are denoted by the same reference signs in the drawings. For repeated components having the same reference sign, descriptions elsewhere in the specification should be referred to.

Figure 1:
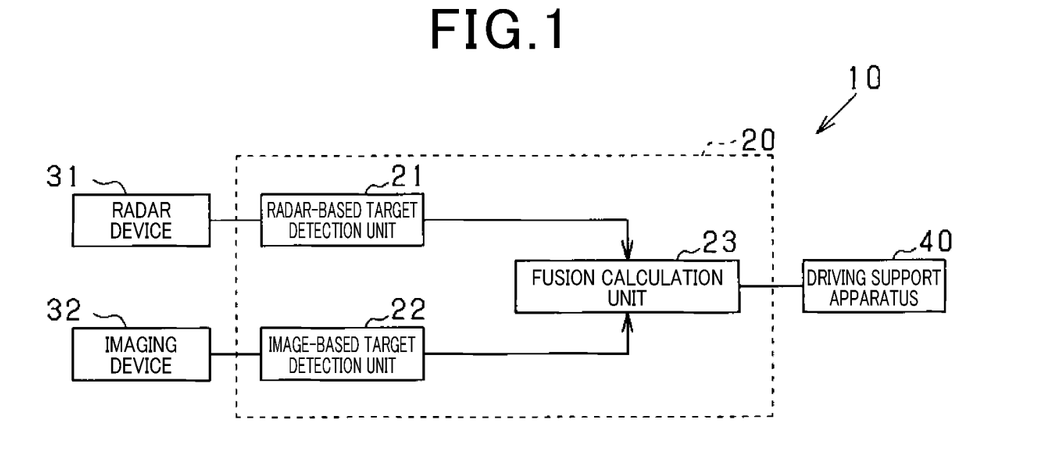
FIG. 1 is a schematic block diagram illustrating a configuration of a driving support system.

FIG. 1 shows a driving support system 10 of the present embodiment, which is mounted to a vehicle to recognize objects around the vehicle, and executes various driving supports based on the recognition of the objects. Accordingly, the system 10 serves, for example, as an auto cruise control system (ACC) that allows the vehicle to run following a vehicle running in the same lane, a pre-crash safety system (PCS) that performs various controls for avoiding collision with an object or reducing collision damage, or the like. As shown in FIG. 1, the driving support system 10 includes an object recognition apparatus 20, various sensors, and a driving support apparatus 40.

The object recognition apparatus 20 is a computer including a CPU, ROM, RAM, an I/O unit, and the like. The CPU executes programs installed in the ROM to perform functions for recognizing objects around the vehicle. The object recognition apparatus 20 is connected to a radar device 31 and an imaging device 32, which are object detection sensors, and receives inputs of detection results of objects from these sensors.

The radar device 31 is a detection device that detects objects by transmitting electromagnetic waves as transmission waves and receiving reflected waves thereof. In the present embodiment, the radar device 31 is constituted by a known millimeter-wave radar that uses high-frequency signals in a millimeter-wave band as transmission waves. The radar device 31 is attached to a front end portion of the vehicle, and transmits radar signals to scan a region extending over a predetermined radar angular range ahead of the vehicle centering on the optical axis. Further, the radar device 31 produces distance measurement data based on the time taken from when the electromagnetic waves are transmitted ahead of the vehicle until when the reflected waves are received, and sequentially outputs this distance measurement data to the object recognition apparatus 20. The distance measurement data includes information on the azimuth in which the object is present, the distance to the object, and the relative speed of the object.

The imaging device 32 is an in-vehicle camera, and includes a monocular camera such as a CCD camera, a CMOS image sensor, or a near-infrared camera. The imaging device 32 is attached to the vehicle at a predetermined level so as to be located at the center of the vehicle in the lateral direction, and captures an image, which is converted to have a bird's eye viewpoint, of a region extending ahead of the vehicle over a predetermined angular range. The imaging device 32 sequentially outputs the captured image data to the object recognition apparatus 20.

The object recognition apparatus 20 sequentially receives inputs of the distance measurement data from the radar device 31 and the image data from the imaging device 32, and recognizes objects using the inputted data. The object recognition apparatus 20 includes a radar-based target detection unit 21, an image-based target detection unit 22, and a fusion calculation unit 23.

The radar-based target detection unit 21 identifies, as a radar-based target, the object detected based on the distance measurement data, and detects the position of the radar-based target relative to the own vehicle by plotting the position information of the identified radar-based target in the xy plane. In the present embodiment, the lateral direction of the own vehicle is taken to be the x-axis, and the longitudinal direction thereof is taken to be the y-axis.

Further, a radar search region is set in an area including the detection point of the radar-based target. The radar search region is set as an area including the position of the radar-based target. The radar search region is set based on the detection characteristics of the radar device 31. The set region has being considered about an error due to the detection characteristics of the radar device 31.

The image-based target detection unit 22 identifies, as an image-based target, the object detected by analyzing the image data, and detects the position of the image-based target relative to the own vehicle by plotting the position information of the identified image-based target in the xy plane. The image-based target detection unit 22 performs pattern matching for the image-based target using a predetermined pattern, and identifies the type of the object, e.g., a vehicle, a pedestrian, or a bicycle, detected by the imaging device 32. The image-based target detection unit 22 generates azimuth angle information of the object relative to the own vehicle, based on the position of the image-based target in the horizontal direction of the image. The azimuth angle information includes an image-based target angle and an azimuth width of the image-based target. The image-based target angle refers to an angle made between a line segment connecting the reference point P0, which indicates the position of the own vehicle, to the detection point of the image-based target, and the longitudinal direction of the own vehicle. The image-based target detection unit 22 sets an image search region as an area including the position of the image-based target by using the image-based target angle, the distance to the target from the reference point P0, and the detection point of the image-based target. The image search region is set based on the detection characteristics of the imaging device 32. The set area has being considered about an error due to the detection characteristics of the imaging device 32.

When an object detected by the radar device 31 is determined to be identical with an object detected by the imaging device 32 based on a predetermined condition, the fusion calculation unit 23 generates a fusion target by combining (fusing) the information on the radar-based target inputted from the radar-based target detection unit 21, with the information on the image-based target inputted from the image-based target detection unit 22. The generated fusion target information is outputted to the driving support apparatus 40. For generating the fusion target information, for example, the distance to the fusion target is calculated by the distance to the radar-based target, and the lateral position and the lateral width of the fusion target are calculated by the lateral position and the azimuth angle of the image-based target. The lateral position refers to a position in the lateral direction of the vehicle (x-axis direction) with respect to the reference point P0. In the present embodiment, the fusion calculation unit 23 serves as an information combining unit and an identical object determining unit.

The driving support apparatus 40 receives an input of the fusion target information generated by the fusion calculation unit 23, and uses the inputted information as a basis to implement various driving support controls by controlling, for example, a brake device, a steering device, a seat belt activation device, an alarm device, or the like. If no fusion target is identified irrespective of at least either of the radar- and image-based targets being identified, various controls for driving support may be performed based on the information on the radar- or image-based target. Driving support for the identified target does not have to be necessarily implemented.

When combining the radar-based target information with the image-based target information, if information on another object has actually been erroneously combined as information on the identical object, recognition accuracy of the object deteriorates. When driving support, such as following driving control or collision avoidance control, for the preceding vehicle is performed based on the fusion target obtained by such an erroneous combination, there is a concern that the driving support cannot be appropriately performed.

Figure 2:
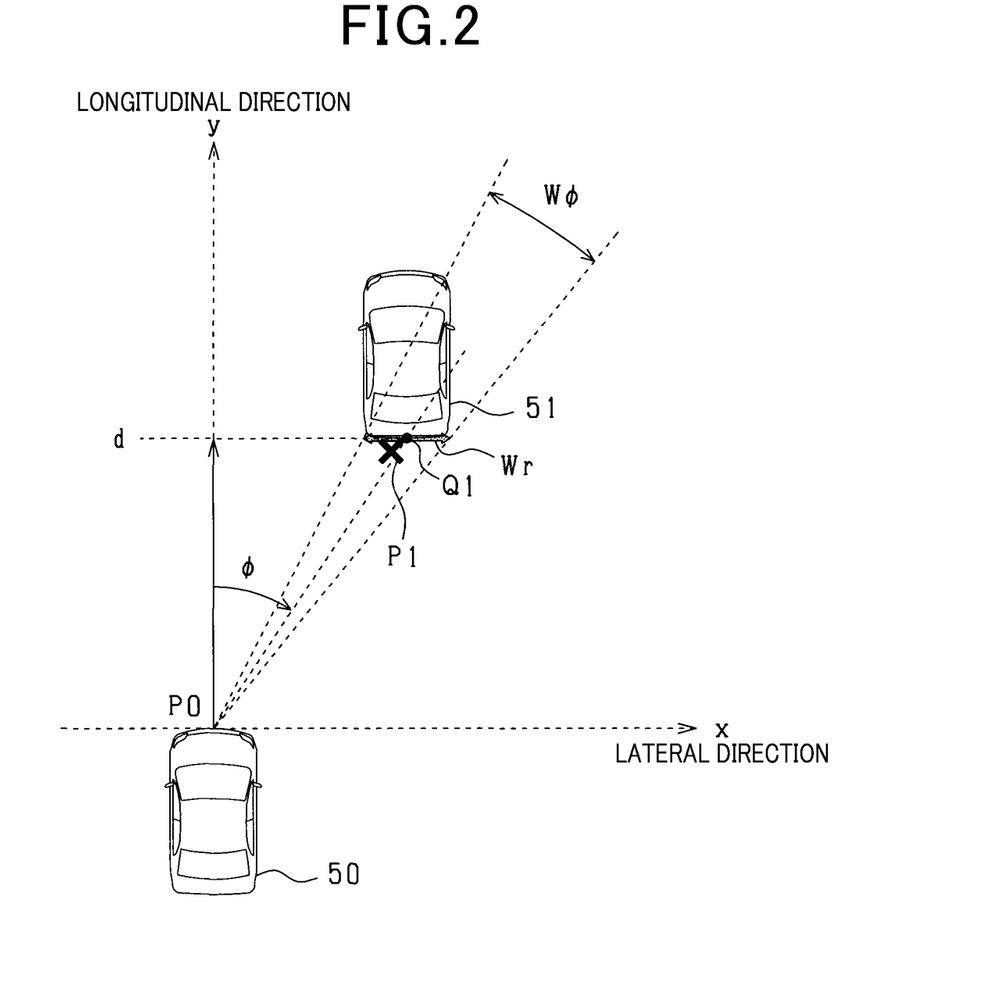
FIG. 2 is a diagram illustrating an FSN (fusion) vehicle width when combination is correctly performed.

If an image-based target and a radar-based target are erroneously combined, the positional relationship changes between the object around the own vehicle and the own vehicle. It is noted that the change in the positional relationship leads to the variation in the physical values generated by combining the radar-based target information with the image-based target information, although some of physical values should actually be invariant. This point will be described referring to FIGS. 2 and 3. FIG. 2 shows a situation in which the image- and radar-based targets are correctly combined, and FIG. 3 shows a situation in which the combination is erroneous.

Figure 3:
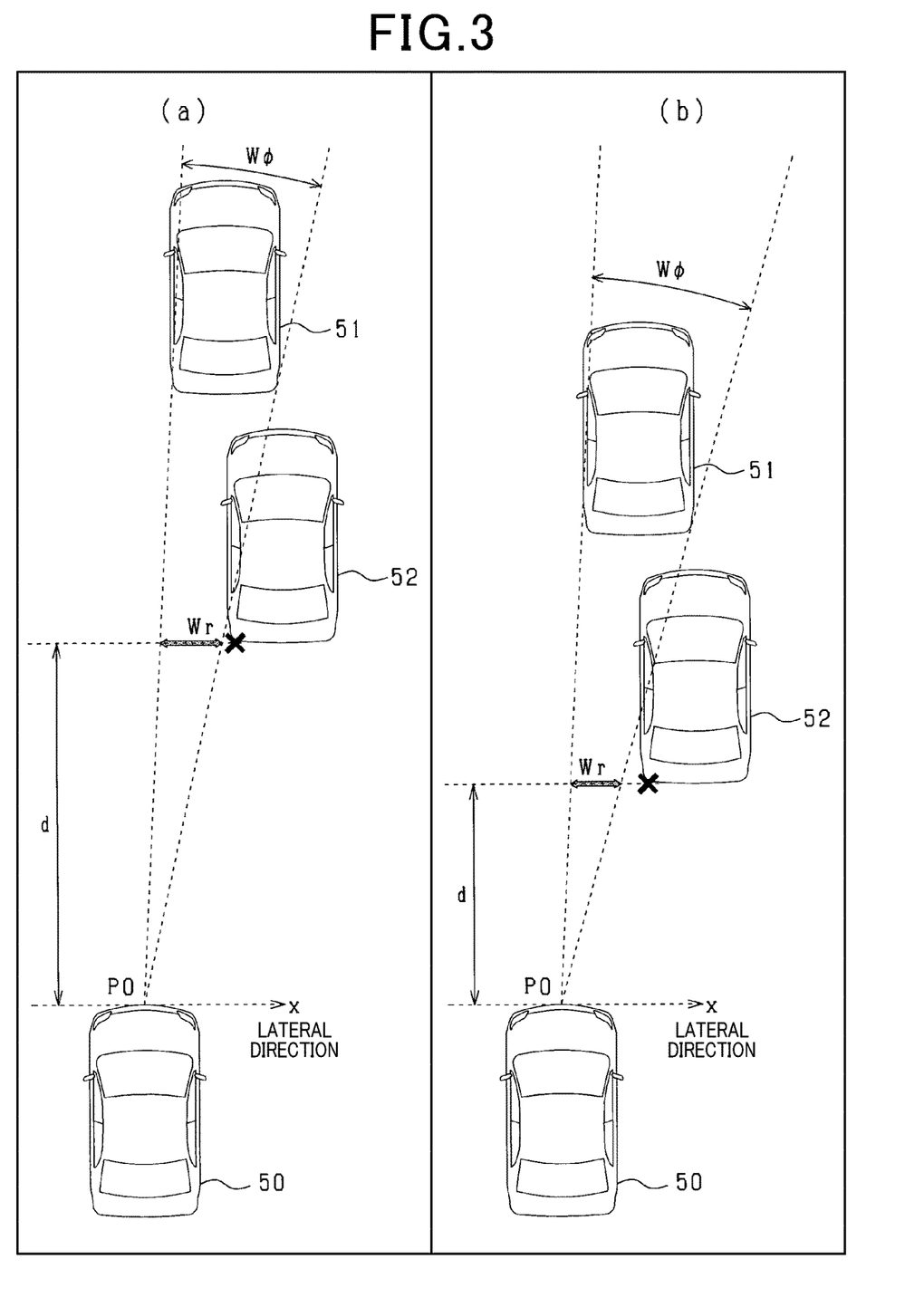
FIG. 3 is a set of diagrams illustrating time-dependent change in the FSN vehicle width in the occurrence of an erroneous combination.

In FIGS. 2 and 3, P1 indicates a detection point of a radar-based target, $\phi$ indicates an image-based target angle, and W$\phi$ indicates an image-based detection width of a preceding vehicle 51 in the x-axis direction. The image-based target angle $\phi$ is formed between a line segment, which connects a center position Q1 to the reference point P0, and the y-axis. The center position Q1 is at the rear end of the preceding vehicle 51 in the lateral direction of the vehicle. The image-based detection width W$\phi$ corresponds to the azimuthal width of the vehicle width of the preceding vehicle 51, and is expressed by an angle in the circumferential direction centering on the reference point P0, over the left- to right-end positions of the preceding vehicle 51.

The lateral width of the preceding vehicle 51 is expressed by the following Equation (1), using the image-based target angle $\phi$ and the image-based detection width W$\phi$ detected by the imaging device 32, and the longitudinal distance d to the preceding vehicle 51 detected by the radar device 31.

$$Wr = d \times (\tan(\phi + W\phi/2) - \tan(\phi - W\phi/2)) \quad (1)$$

When the image- and radar-based targets are identical, the physical values of the preceding vehicle 51 are determined based on the positional relationship between the two vehicles i.e. the own vehicle 50 and the preceding vehicle 51 (first vehicle). Therefore, the vehicle width calculated using Equation (1) (termed FSN vehicle width Wr hereinafter) does not change with time and takes a constant value. The longitudinal distance d is a component in the longitudinal direction within a distance connecting the own vehicle 50 and the preceding vehicle 51.

The following description deals with the case where an image-based target has been erroneously combined with a radar-based target. FIG. 3 assumes a situation where a second vehicle 52 (another vehicle) is present between the own vehicle 50 and the preceding vehicle 51, and the radar device 31 has detected the second vehicle 52. FIG. 3(b) shows a state where the own vehicle 50 has approached closer to the preceding vehicle 51 and the second vehicle 52 than in FIG. 3(a).

When an erroneous combination occurs, the positional relationship of the three vehicles i.e. the own vehicle 50, the preceding vehicle 51, and the second vehicle 52 changes. As a result, the FSN vehicle width Wr calculated through Equation (1) changes with time. Specifically, as shown in FIG. 3, the closer the own vehicle 50 is to the preceding vehicle 51 and the second vehicle 52, the shorter the FSN vehicle width Wr becomes.

In this regard, in the present embodiment, when an object is detected by both the radar device 31 and the imaging device 32, the object recognition device 20 combines the radar-based target information with the image-based target information to generate combined target information as a parameter used for determining the radar- and image-based targets as being identical. Then, it is determined whether the radar- and image-based targets are identical based on the time-dependent change in the generated combined target information. In particular, in the present embodiment, the object recognition apparatus 20 uses the longitudinal distance d, which is the information on the distance to the object, as radar-based target information, and also uses the image-based target angle $\phi$, which is the information on the azimuth angle of the object relative to the own vehicle 50, and the image-based detection width W$\phi$, as image-based target information. Specifically, using the longitudinal distance d, the image-based target angle $\phi$, and the image-based detection width W$\phi$ as a basis, the object recognition apparatus 20 calculates the FSN vehicle width Wr as combined target information through Equation (1). Then, by monitoring the FSN vehicle width Wr, the object recognition apparatus 20 implements identical object determination.

Referring to the flow diagram of FIG. 4, description will be given of a fusion calculation process of the present embodiment. The process of FIG. 4 is cyclically executed by the fusion calculation unit 23 of the object recognition apparatus 20 if an object is detected by both the radar device 31 and the imaging device 32.

Figure 4:
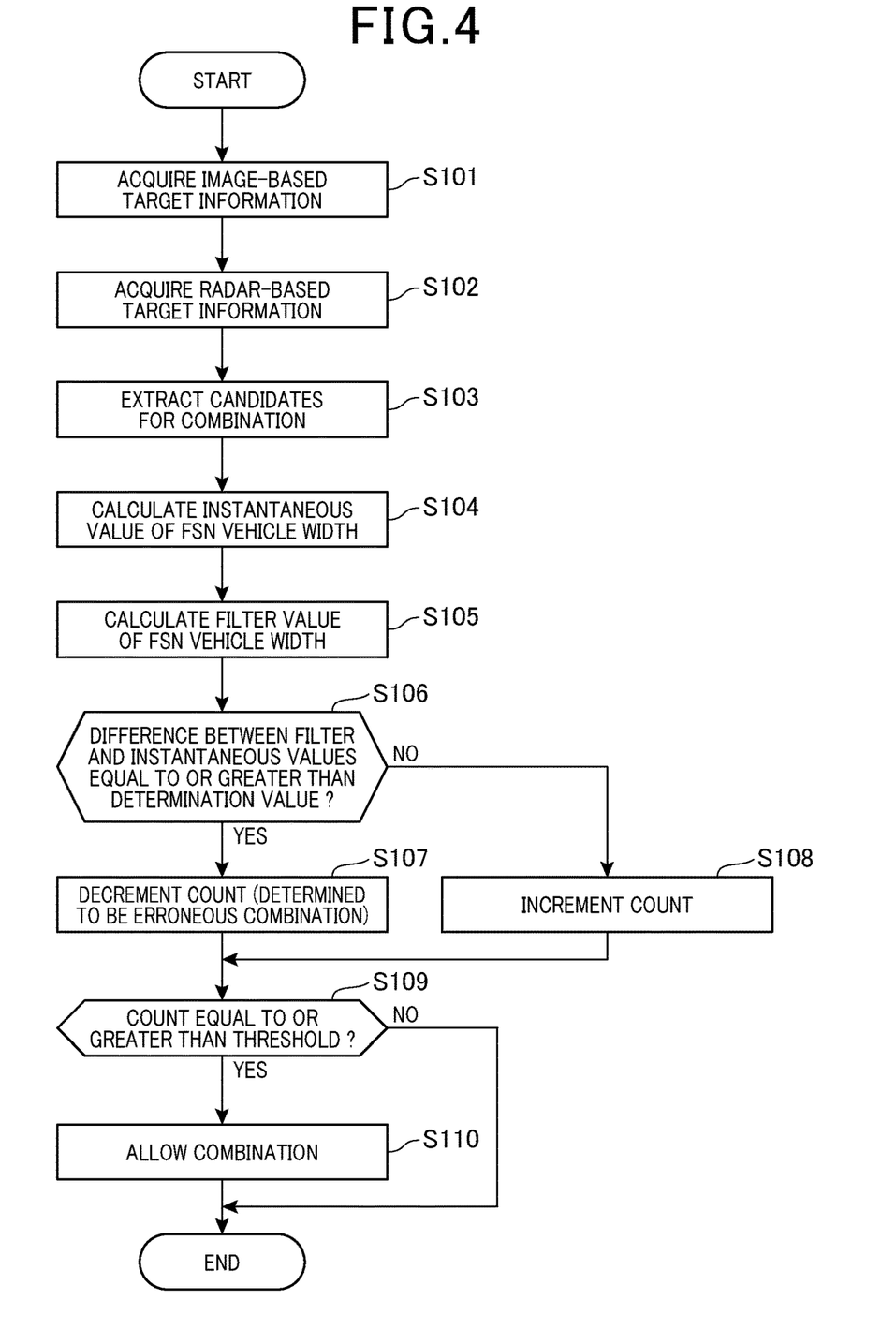
FIG. 4 is a flow diagram illustrating a filter calculation process.

In FIG. 4, at step S101, image-based target information is acquired from the image-based target detection unit 22, and at step S102, radar-based target information is acquired from the radar-based target detection unit 21. At the subsequent step S103, a candidate combination of image- and radar-based targets is extracted from the image-based targets included in the image-based target information and the radar-based targets included in the radar-based target information. The combination is extracted based on the positional relationship between the image- and radar-based targets. Specifically, the fusion calculation unit 23 extracts a combination that includes an overlap between the radar search region set by the radar-based target detection unit 21 and the image search region set by the image-based target detection unit 22.

If a candidate combination has been extracted, control proceeds to step S104 where an instantaneous value Wr1 of the FSN vehicle width Wr is calculated through Equation (1) using the information on the image- and radar-based targets of the candidate combination. At step S105, the FSN vehicle width Wr is filtered to calculate the filter value Wr2. The filtering corresponds to smoothing that uses the instantaneous value Wr1 of the present cycle and the instantaneous values of the FSN vehicle width Wr of all the previous cycles.

Figure 5:
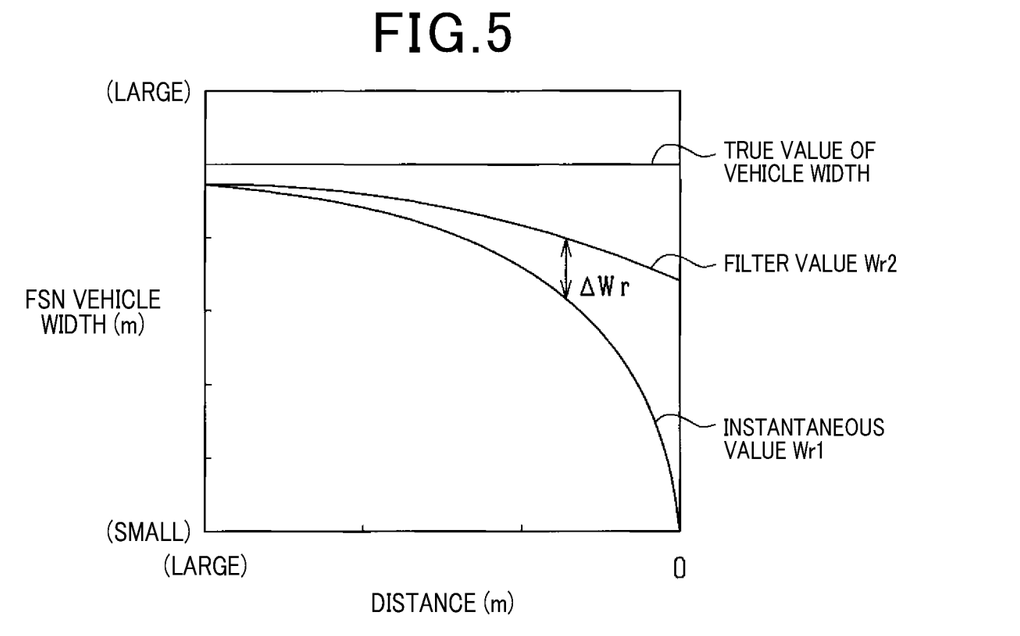
FIG. 5 is a diagram illustrating a relationship between the distance to preceding vehicle, the FSN vehicle width and the true value of vehicle width.

FIG. 5 shows a relationship between the distance from the own vehicle 50 to the preceding vehicle 51, the FSN vehicle width Wr, and the true value of the width of the preceding vehicle 51. The FSN vehicle width Wr depends on the distance from the own vehicle 50 to the preceding vehicle 51. Specifically, as the distance to the preceding vehicle 51 becomes shorter, the FSN vehicle width Wr becomes smaller than the actual vehicle width (true value). The filter value Wr2 is less likely to vary than the instantaneous value Wr1 due to time lag. In the present embodiment, the instantaneous value Wr1 is subtracted from the filter value Wr2 to obtain a difference ΔWr (ΔWr=Wr2−Wr1), and the difference ΔWr is used as an index of the time-dependent change of the combined target information. When the difference ΔWr is equal to or greater than a determination value Tw, it is determined that there is a high probability of erroneous combination.

That is, it is determined, at step S106 of FIG. 4, whether the difference ΔWr is equal to or greater than the determination value Tw. If ΔWr≥Tw, a counter Cw for combination determination is decremented at step S107, and if ΔWr<Tw, the counter Cw is incremented at step S108. The counter Cw is set for each candidate combination, and decremented and incremented for each candidate combination.

If it is determined, at step S109, that the counter Cw shows a count that is equal to or greater than a threshold Tc, control proceeds to step S110 where it is determined that the image- and radar-based targets of the candidate combination indicate an identical object, and the image-based target information is combined with the radar-based target information. If the counter Cw shows a count that is less than the threshold Tc, the present process is terminated without allowing combination. While the image- and radar-based targets of the candidate combination are being detected, the corresponding counter Cw is decremented or incremented, and when at least either of the image- and radar-based targets of the candidate combination is no longer detected, the corresponding counter Cw is discarded.

According to the present embodiment specifically described above, the following advantageous effects are obtained.

For the radar- and image-based targets extracted as a candidate combination, there is a difference in time-dependent change of the combined target information, between the case where the combined target information is generated based on a correct combination and the case where the combined target information is generated based on an erroneous combination. In this regard, an identical object determination as to whether the radar- and image-based targets indicate an identical object is made based on the time-dependent change of the combined target information. According to such a configuration, a clear distinction can be made as to whether the object detected by the radar device 31 and the object detected by the imaging device 32 are identical.

Further, since the identical object determination is implemented using the information obtained from both the radar device 31 and the imaging device 32, the influence of deterioration in the accuracy of image recognition can be compensated by the detection performance of the radar device 31. As a result, identical object determination can be implemented with high accuracy, while minimizing the influence of deterioration in the accuracy of image recognition.

As sensor characteristics, the radar device 31 exerts high accuracy in distance measurement, while the imaging device 32 exerts poor performance in distance measurement based on image recognition. For a distant area in particular, accuracy of image recognition tends to deteriorate due to decrease in the number of pixels. The imaging device 32 however has sufficiently high detection accuracy in the lateral direction of the vehicle. In this regard, the object recognition apparatus 20 uses the longitudinal distance d, which is the information on the distance to the object, as radar-based target information, and also uses the image-based target angle ϕ, which is the information on the azimuthal angle of the object relative to the own vehicle 50, and the image-based detection width Wϕ, as image-based target information. Specifically, it is so configured that, using the longitudinal distance d, the image-based target angle ϕ, and the image-based detection width Wϕ as a basis, the object recognition apparatus 20 calculates the combined target information. With this configuration, highly reliable information is obtained even for a distant target for which the accuracy of image recognition tends to deteriorate due to decrease in the number of pixels in image recognition. Furthermore, by implementing identical object determination using such highly reliable information, determination accuracy is improved.

In a situation where the physical values of the preceding vehicle 51 are determined only by the positional relationship between the two vehicles i.e. the own vehicle 50 and the preceding vehicle 51, the physical values that should be invariant, as is the vehicle width, will not change with time. In contrast, in the occurrence of an incorrect combination, the physical value that should be invariant will vary due to the variation in the positional relationship of the three vehicles i.e. the own vehicle 50, the preceding vehicle 51, and the second vehicle 52. In this regard, time-dependent change of the FSN vehicle width Wr is ensured to be tracked using the vehicle width, which is inherently an invariant physical value, as combined target information. Thus, identical object determination can be implemented with high accuracy.

Other Embodiments

The present disclosure is not limited to the embodiment set forth above, and may be implemented as follows, for example.

In the above embodiment, the difference ΔWr between the instantaneous value Wr1 and the filter value Wr2 is used as an index of time-dependent change of the combined target information, and the difference ΔWr is used as a basis for determining whether the image- and radar-based targets are identical. However, the index used for an identical object determination is not limited to this. For example, an erroneous combination may be determined to have occurred when decrease of the instantaneous value Wr1 has become a predetermined value or more since the start of tracking.

If the radar- and image-based targets having relative speeds different from each other are erroneously combined, the combined target information generated by combining the radar-based target information with the image-based target information tends to provide instantaneous values with large variation. In this regard, a variation ratio of the combined target information may be used as an index of time-dependent change of the combined target information, and identical object determination may be implemented based on the variation ratio of the combined target information. Specifically, for example, a difference between the present cycle value and the previous cycle value may be calculated (present cycle value−previous cycle value) for the instantaneous value Wr1 or the filter value Wr2 of the fusion vehicle width, and when the calculated difference has become a determination value or more, an erroneous combination may be determined as having occurred.

Figure 6:
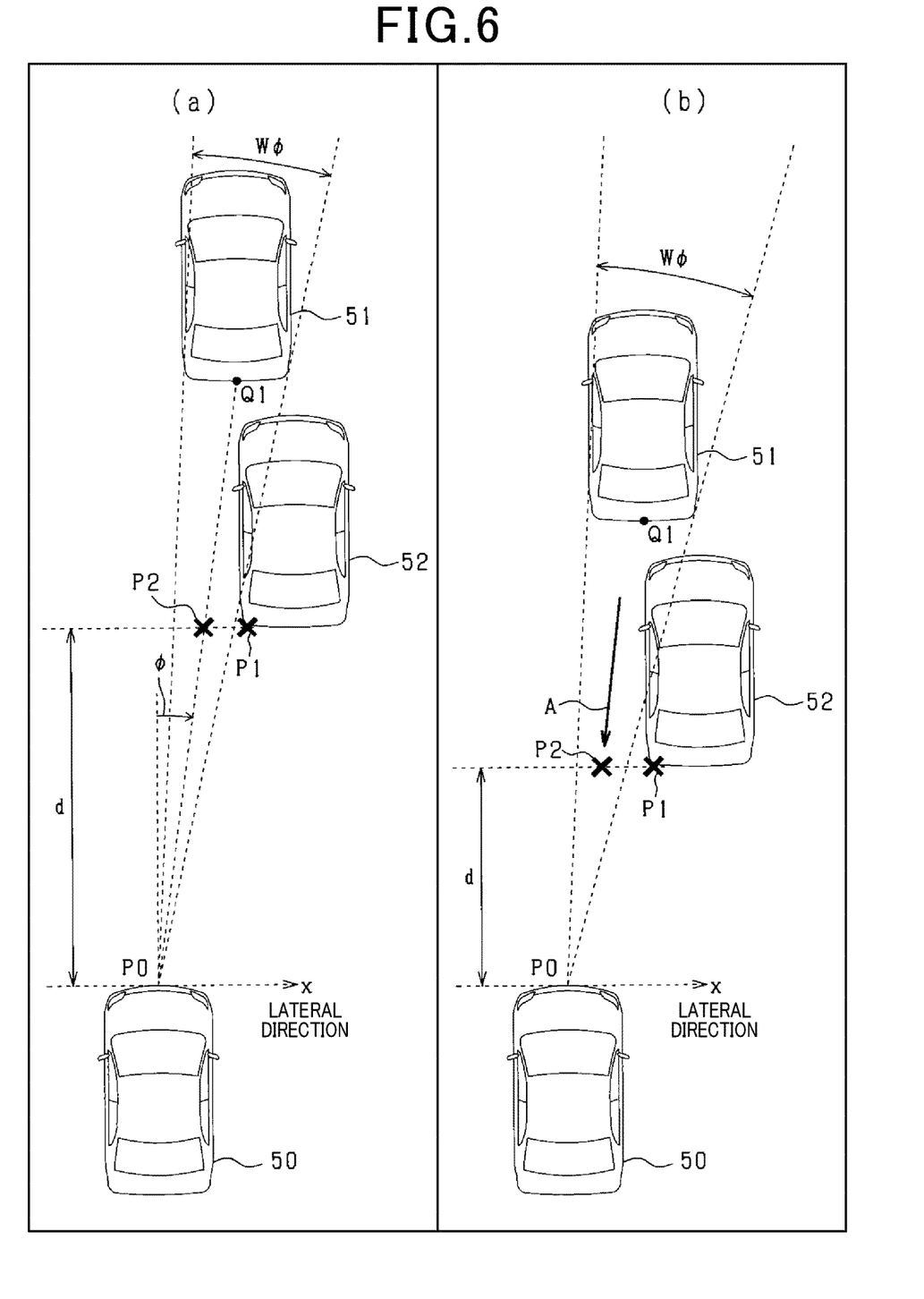
FIG. 6 is a set of diagrams illustrating time-dependent change in combined target information, according to another embodiment.

In the above embodiment, identical object determination is implemented using a vehicle width as combined target information. However, the identical object determination may be implemented using a lateral position, which is the position information of an object in the lateral direction of the own vehicle, as combined target information. FIG. 6 is a set of diagrams illustrating a mode of implementing identical object determination, based on the time-dependent change in the lateral position of an object. In FIG. 6, P2 indicates a horizontal position of the preceding vehicle 51 (termed FSN lateral position hereinafter) calculated using a longitudinal distance d detected by the radar device 31 and an image-based target angle φ detected by the imaging device 32. In FIG. 6, a center position Q1 in a vehicle rear end portion is taken to be the lateral position of the preceding vehicle 51. The image-based target angle φ refers to an angle formed between a line segment P0-Q1 connecting the reference point P0 to the center position Q1 and the longitudinal direction (y-axis direction) of the own vehicle 50. FIG. 6(b) shows a state where the own vehicle 50 has approached nearer to the preceding vehicle 51 and the second vehicle 52 than in FIG. 6(a).

If the radar-based target information and the image-based target information are correctly combined, the FSN lateral position P2 (P2=d×tan φ) comes straight toward the own vehicle 50 along the vehicle traveling direction, as the own vehicle 50 approaches the preceding vehicle 51. If the radar- and image-based targets are erroneously combined, the FSN lateral position P2 comes closer, as shown in FIG. 6, to the reference point P0 than does the true value. Further, as the own vehicle 50 approaches the preceding vehicle 51, the FSN lateral position P2 appears nearer to the reference point P0, and approaches closer to the own vehicle 50 as indicated by the arrow A in FIG. 6(b). That is, the FSN lateral position P2 shifts to a direction different from the vehicle traveling direction. Therefore, identical object determination for the radar- and image-based targets can be accurately implemented based on the time-dependent change of the FSN lateral position P2. Specifically, the FSN lateral position P2 (instantaneous value) is calculated from the longitudinal distance d of the radar-based target and the image-based target angle φ of the image-based target. If the calculated present cycle value has changed toward the reference point P0 by a predetermined value or more, than the previously calculated cycle value has done, the counter Cw for combination determination is decremented, and if the calculated current cycle value has not changed by a predetermined value or more, the counter Cw is incremented. Then, if the count of the counter Cw has reached a value equal to or greater than a threshold, it is determined that the image- and radar-based targets of the candidate combination indicate an identical object, and the image-based target information is combined with the radar-based target information.

The difference ΔWr increases as the distance between the own vehicle 50 and the object becomes smaller (see FIG. 5). Therefore, the determination value Tw used for comparison with the difference ΔWr may be a variable value. For example, the determination value Tw may be set to a larger value as the distance between the own vehicle 50 and the object becomes smaller.

The components described above are conceptual and are not limited to the embodiments described above. For example, the functions of one component may be distributed as plural components, and the functions that plural components have may be combined into one component.

The present disclosure has been described by way of examples; however, the present disclosure should not be construed as being limited to these examples or structures. The present disclosure should encompass various modifications or alterations within the range of equivalents. In addition, various combinations and modes, as well as other combinations and modes, including those which include one or more additional elements, or those which include fewer elements should be considered to be in the scope and spirit of the present disclosure.

The invention claimed is:

1. An object recognition apparatus that recognizes an object around an own vehicle, using a radar device and an imaging device, comprising:
   an information combining unit that generates a fusion target by fusing radar-based target information with image-based target information for a state in which the object is being detected by the radar device and the imaging device, the radar-based target information being information on a first object detected by the radar device, the image-based target information being information on a second object detected by the imaging device; and
   an identical object determining unit that determines that the first object detected by the radar device is identical with the second object detected by the imaging device, in response to determining that a difference in time-dependent change of the fusion target is less than a predetermined value, wherein:
   the object is a vehicle; and
   the identical object determining unit determines that the first object is identical with the second object, in response to determining that the difference in time-dependent change of a vehicle width of the fusion target is less than the predetermined value.

2. The object recognition apparatus according to claim 1, wherein
   the information combining unit generates the fusion target by using distance information as the radar-based target information and azimuth angle information as the image-based target information, and combining the distance information with the azimuth angle information, the distance information being information on a distance to the object, the azimuth angle information being information on an azimuth angle of the object relative to the own vehicle; and
   calculates the vehicle width of the fusion target based on the distance information and the azimuth angle information.

3. The object recognition apparatus according to claim 1, wherein
   the fusion target is position information of the object in a lateral direction of the own vehicle.

4. An object recognition method that recognizes an object around an own vehicle, using a radar device and an imaging device, comprising the steps of:
   generating a fusion target as information on the object by fusing radar-based target information with image-based target information for a state in which the object is being detected by the radar device and the imaging device, the radar-based target information being information on a first object detected by the radar device, the image-based target information being information on a second object detected by the imaging device; and
   determining that the first object detected by the radar device is identical with the second object detected by the imaging device, in response to determining that a difference in time-dependent change of the fusion target is less than a predetermined value,
   wherein:
   the object is a vehicle; and
   the first object is determined to be identical with the second object, in response to determining that the difference in time-dependent change of a vehicle width of the fusion target is less than the predetermined value.

5. The object recognition apparatus according to claim 1, wherein
the difference in time-dependent change of the vehicle width of the fusion target is a physical value which is due to variation in a position relationship between the object around the own vehicle and the own vehicle in the occurrence of an incorrect fusion of the fusing of the radar-based target information with the image-based target information.

6. The object recognition apparatus according to claim 1, wherein
the information combining unit:
generates the fusion target by using distance information as the radar-based target information and azimuth angle information as the image-based target information, and combining the distance information with the azimuth angle information, the distance information being information on a distance to the object, the azimuth angle information being information on an azimuth angle of the object relative to the own vehicle; and
calculates the position of the fusion target which is the position of the object in the lateral direction of the own vehicle based on the distance information and the azimuth angle information.

7. The object recognition apparatus according to claim 1, wherein
the predetermined value is a variable value that changes based on a distance between the own vehicle and the object around the own vehicle.

8. An object recognition apparatus that recognizes an object around an own vehicle, using a radar device and an imaging device, comprising:
an information combining unit that generates a fusion target by fusing radar-based target information with image-based target information if the object is being detected by the radar device and the imaging device, the radar-based target information being information on a first object detected by the radar device, the image-based target information being information on a second object detected by the imaging device; and
an identical object determining unit that determines that the first object detected by the radar device is identical with the second object detected by the imaging device, in response to determining that a difference in time-dependent change of the fusion target is less than a predetermined value,
wherein
the identical object determining unit determines that the first object is identical with the second object, in response to determining that the difference in time-dependent change of a position of the fusion target in a lateral direction of the own vehicle is less than the predetermined value.

9. The object recognition apparatus according to claim 8, wherein
the difference in time-dependent change of the position of the fusion target in the lateral direction of the own vehicle is a difference in time-dependent change between the case where the fusion target is generated based on a correct fusion and the case where the fusion target is generated based on an incorrect fusion.

\* \* \* \* \*